Sept. 28, 1926.  
C. J. MANNING  
1,601,315  
PRESSURE INDICATOR FOR PNEUMATIC TIRES  
Filed March 19, 1925
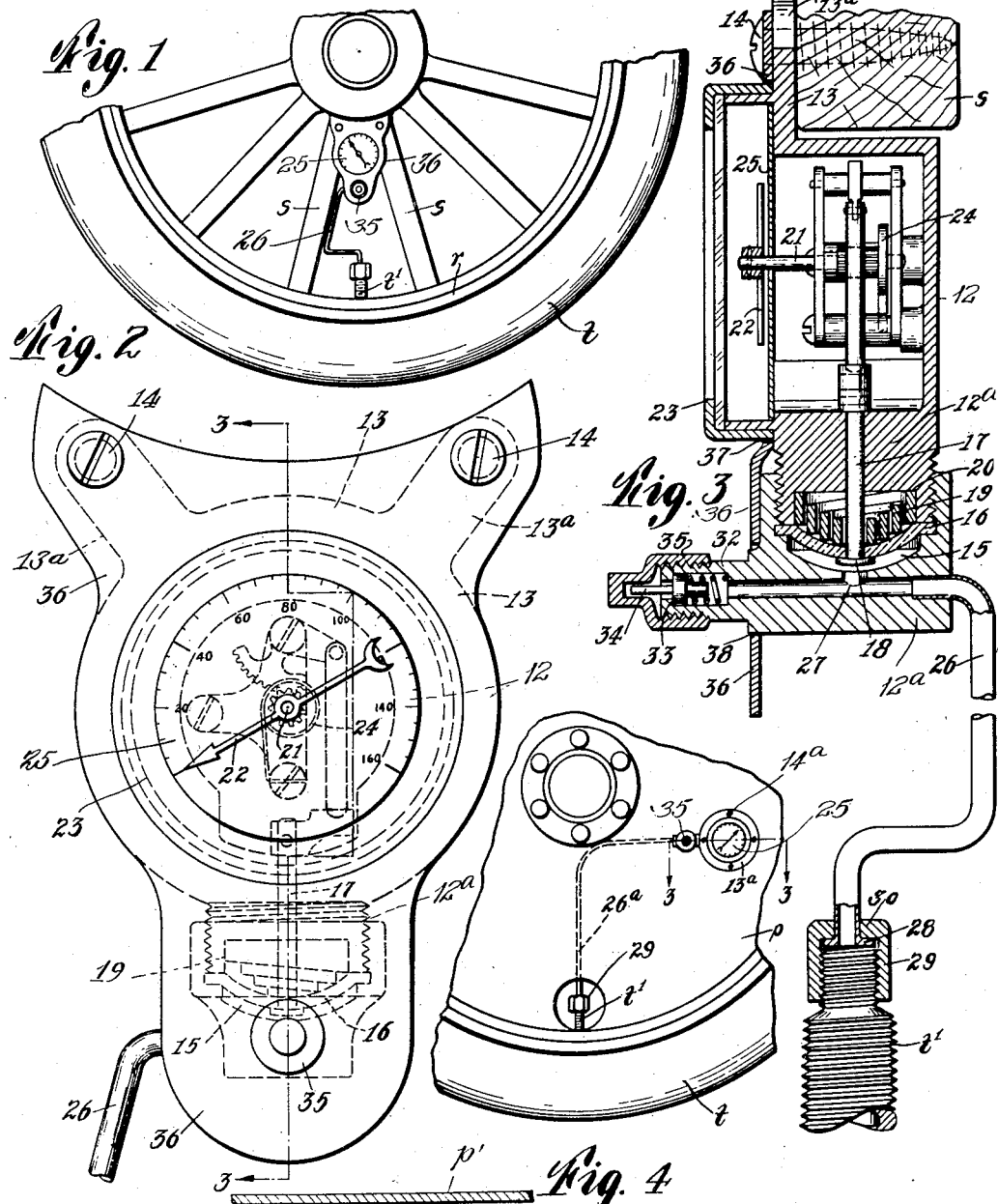
Inventor  
Coleman J. Manning  
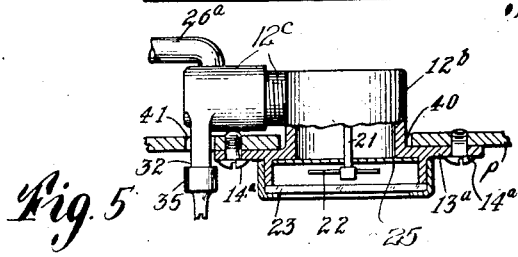  
Att'ys.

UNITED STATES PATENT OFFICE.

COLEMAN J. MANNING, OF MEDFORD, MASSACHUSETTS.

PRESSURE INDICATOR FOR PNEUMATIC TIRES.

Application filed March 19, 1925. Serial No. 16,655.

This invention is embodied in certain improvements hereinafter described, in a pressure indicator including a pressure gauge, whose casing is adapted to be rigidly mounted on and secured to a rigid portion of a vehicle wheel, and a flexible tube adapted to flexibly connect the gauge casing with the usual inflating tube which projects through a wheel rim from the inner tube or other air chamber of a pneumatic tire.

The object is to provide a gauge adapted to be supported by the body of the wheel, and including a nipple projecting outward from the outer side of the wheel, so that it is in position to be conveniently coupled to an air conduit employed to inflate the tire of either a spoked wheel or a disk wheel.

Of the accompanying drawings forming a part of this specification,—

Figure 1 is a side view, showing a portion of a spoked wheel having a pneumatic tire and a pressure indicator embodying the improvements.

Figure 2 is an enlargement of a portion of Figure 1.

Figure 3 is a section on line 3—3 of Figure 2, showing in section the free end portion of the flexible tube, and in elevation, a portion of the usual inflating tube of a pneumatic tire.

Figure 4 is a fragmentary side view, showing my improvements embodied in a disk wheel.

Figure 5 is a section on line 5—5 of Figure 4.

The same reference characters indicate the same parts in all of the figures.

In the embodiment of the invention shown by Figures 1, 2 and 3, 12 designates the head portion of a gauge casing containing pressure registering mechanism formed to enter an opening in the wheel formed by the space between two contiguous spokes $s$. The head is provided with attaching means whereby it may be rigidly secured to a portion of the outer side of the wheel formed by the outer sides of said spokes. The wheel has a pneumatic tire $t$ and the usual inflating tube $t'$ projecting from the air space of the tire through the wheel rim $r$. The attaching means is embodied, in this instance, in a flat-sided seating flange 13, integral with the head portion 12 and projecting from one side thereof, and bearing on the flat outer sides of the inner end portions of said spokes, the flange being perforated for the reception of attaching screws 14, engaged with the spokes.

The flange is preferably provided with projections or ears 13$^a$ (Figure 2), through which the screws pass.

The casing also includes a neck portion, projecting from the side of the head portion 12, and designated as a whole by 12$^a$ (Figures 2 and 3). Within the neck portion is an air chamber 15, associated with the registering mechanism of the gauge.

Although any suitable registering mechanism may be employed, I prefer that shown by Figures 2 and 3, including a flexible rubber diaphragm 16, forming one side of an air space in the chamber, as shown by Figure 2, a rod 17, whose head 18 bears on the under side of the diaphragm, the rod passing through the diaphragm, and a volute spring 19 seated on an abutment 20, within the neck portion 12$^a$ of the casing and normally depressing the central portion of the diaphragm.

When there is sufficient air pressure in the chamber 15 to overcome the pressure of the spring, the diaphragm and rod are raised and the rod imparts, through suitable connections, a turning movement to a rock-shaft 21, journaled in fixed bearings in the head portion 12 of the casing. The rock-shaft carries a pointer 22, located in an outwardly projecting indicator box 23, constituting a part of the head portion of the casing. A spring 24 normally holds the pointer at zero on a dial 25.

26 designates a flexible tube, preferably seamless and of copper, of a length sufficient to extend from the predetermined location of the neck portion 12$^a$ of the casing to the inflating tube $t'$. One end of the flexible tube is fixed to the gauge casing and communicates through a passage 27 with the chamber 15. The opposite end of the flexible tube is provided with coupling means for detachable engagement with the inflating tube, said means preferably including an outwardly projecting flange 28 (Figure 3) on the flexible tube, and a coupling sleeve 29, internally threaded to engage the usual external thread on the inflating tube, and provided with an inwardly projecting flange 30, bearing on the flange 28.

The neck portion 12$^a$ of the casing to which the flexible tube 26 is attached, is provided with a nipple 32, having a springclosed valve 33, whose stem 34 projects from the nipple. When the cap 35 is removed from the nipple, an air-supplying conduit may be coupled to the nipple and caused to open the valve. The nipple communicates through the passage 27 with the chamber 15, and the flexible tube 26, so that the pressure of air supplied by said conduit extends to the chamber and to the air space of the tire.

The nipple 32 projects outward from the neck portion $12^a$, and faces in the same direction as the dial 25 of the registering mechanism, so that the nipple projects outward from the side of the wheel to which the gauge casing is attached, as shown by Figure 3. When the gauge casing is attached to a seat at the outer side of the wheel, the dial faces outward from the outer side, and the nipple projects outward from the same side of the wheel, and is conveniently accessible by a person standing at the outer side of the wheel and manipulating a coupling member on the delivering end of an air-supplying conduit.

36 designates a metal plate or apron confined against the outer side of the seating flange 13 by the attaching screws 14. Said plate has a larger orifice 37, through which the indicator box 23 projects, and a smaller orifice 38, through which the nipple 32 projects. The plate 36 distributes the clamping pressure of the attaching screws 14, over a considerable portion of the outer side of the casing and thus increases the strength of the connection between the casing and the wheel. The plate also conceals the outer side of the casing, and constitutes a neat and desirable finish.

The outward projection of the nipple is particularly advantageous in the disk wheel shown by Figures 4 and 5, in which $p$ designates the outer one of the two side plates or disks constituting the wheel body, and $p'$ designates the inner disk. The outer disk $p$ is provided with an orifice 40 (Figure 5), receiving the head portion of the gauge casing, here designated $12^b$. The head portion of the casing is provided with an annular seating flange $13^a$, bearing on the outer side of the disk $p$, and attached thereto by screws $14^a$. The flexible tube, here designated $26^a$, extends from the neck portion $12^c$ of the casing to the inflating tube $t'$. The disk $p$ has an orifice 41 (Figure 5) through which the nipple 32 projects, the nipple projecting from the outer side of the disk wheel, so that it is conveniently accessible.

The flexible tube is preferably bent in each case as indicated by Figures 1, 3 and 4, to increase its flexibility.

It will be seen that the seating flange 13 shown by Figs. 2 and 3 and $13^a$ shown by Figs. 4 and 5, located at the outer end of the head and arranged to overlap and bear on a portion of the outer side of the wheel adjacent to an opening therein, locates the head in said opening and the indicator box outside the opening and projecting from the outer side of the wheel, so that the diameter of the box may exceed the width of the opening to any extent desired. In other words, the diameter of the indicator box and the dial are not limited by the size of the wheel opening and may overlap the outer side of the wheel to any desired extent, so that the dial and pointer may be large enough to be conveniently read at a considerable distance from the wheel.

I claim:

For use with a wheel having a pneumatic tire, and a tire-inflating tube; a tire-pressure indicator comprising a gauge casing including a head formed to enter an opening in a wheel, an outwardly projecting seating flange, located at the outer end of the head and provided with means whereby it may be attached to the wheel, and an indicator box fixed to the seating flange and located at the outer side thereof, said box containing a dial, a neck projecting from one side of the head and containing an air chamber, the neck being provided with a valved nipple; pressure-registering mechanism operable by air pressure in said chamber, said mechanism including a pointer located in the indicator box, to cooperate with the dial; and conduit means connecting the air chamber and nipple with the inflating valve of the wheel, the seating flange being arranged to overlap and bear at its inner side on a portion of the outer side of the wheel adjacent to said opening, and to offset the indicator box, the dial, and the pointer, outward from said outer side, so that the diameters of the box and dial are not limited by the size of the wheel opening.

In testimony whereof I have affixed my signature.

COLEMAN J. MANNING.